(No Model.)

G. ADAIR.
GARDEN CULTIVATOR, &c.

No. 504,189. Patented Aug. 29, 1893.

Witnesses
H. P. Wilson
W. Hume Clendenin

Inventor
George Adair
per John G. Manahan
his Attorney

UNITED STATES PATENT OFFICE.

GEORGE ADAIR, OF ROCK FALLS, ILLINOIS.

GARDEN-CULTIVATOR, &c.

SPECIFICATION forming part of Letters Patent No. 504,189, dated August 29, 1893.

Application filed November 19, 1892. Serial No. 452,595. (No model.)

*To all whom it may concern:*

Be it known that I, GEORGE ADAIR, a citizen of the United States, residing at Rock Falls, in the county of Whiteside and State of Illinois, have invented certain new and useful Improvements in Garden Cultivators and Seeders; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention has reference to garden cultivators and seeders, and consists essentially in the provision of two fixed blades, having a bowed and divergent attachment to a common handle, with a third blade pivotally seated between the shanks of said outside blades a sufficient distance in front of the latter to permit of the attachment of an automatic seeder to such central blade, in position to deposit the seed upon the gash made by said first or central blade, and in position to be covered by the said rear blades.

The purpose of my invention is to afford a light and convenient tool for the cultivation of gardens and small farms, as a substitute for the usual hoe, and also to provide such implement with a removable seed mechanism, having adjustable openings for the exit of the seed, and thereby adapted to distribute all kinds of seed in any desired quantities. I attain these purposes by the mechanism illustrated in the accompanying drawings, in which—

Figure 1:
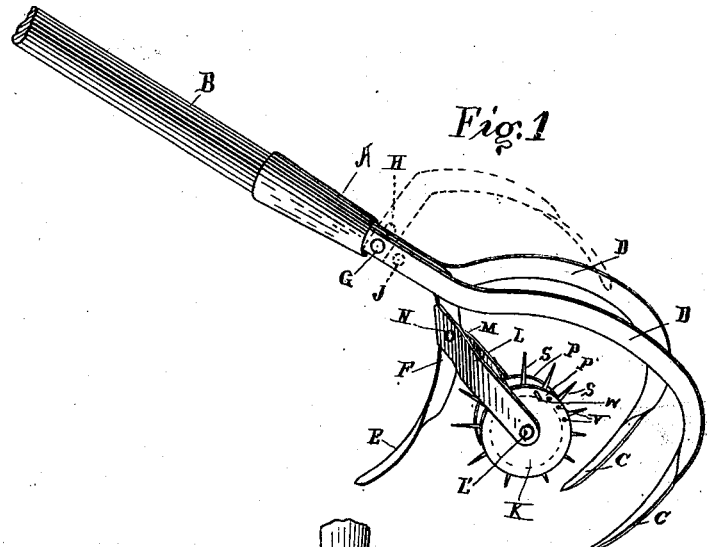
Figure 2:
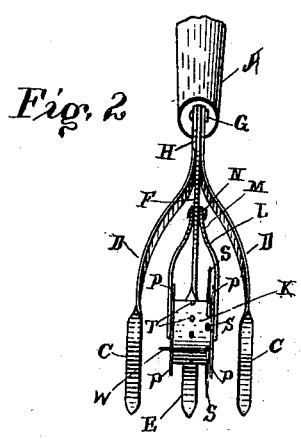
Figure 3:
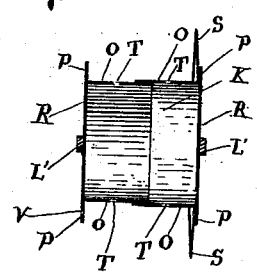

Figure 1 is a perspective of a machine embodying my invention. Fig. 2 is a plan of the same. Fig. 3 is a detail of the seed mechanism.

Similar letters refer to similar parts throughout the several views.

A is a ferrule, in which is inserted a suitable handle B, of such length as to enable the operator to walk erect while drawing the implement behind him.

C—C are the outside blades, which are attached to the handle B by means of curved shanks D—D, the inner ends of which are inserted within the ferrule A, and from thence are upwardly, outwardly, and afterward downwardly suitably attached at their lower extremities to the blades C. In my present construction, I make the shanks D of steel plate inserted edgewise in the socket A, and turned one-quarter at their locality just above the top of the blades C, and draw the lower ends of the shanks D out laterally to a cutting edge to form the blade C.

E is a central blade constructed in the same manner and seated somewhat in advance of the blades C—C, and in line with the center of the interval between said rear blades. The blade C has a shorter shank F, the front end of which is pivotally seated between the shanks D—D, by means of a transverse bolt G. The shank F extends to the rear a short distance between the shanks D—D, in substantially the same plane thereof, and is turned downward as shown.

In the rear of the pivotal connection of shank F, and between the shanks D—D, there is formed on the side of shank F a boss H, which, when the blade E is down on the plane of the blades C—C, registers in a recess J formed in the inner wall of the shank D, contiguous thereto. This boss connection prevents the shank F from rising in the operation of the tool, but when it is desired, in cultivation, to straddle a row of plants, by slightly springing the shanks D—D apart the boss H will be disengaged from recess J, and the shank F, which is attached to blade E, can be thrown up and out of the way, as shown in dotted lines in Fig. 1. By forming a second recess J in the inner wall of the other shank D, the shank F can be inserted and used alone.

K is a circular seed hopper, having central lateral journals L', pivotally seated, respectively, in the rear ends of a bifurcated frame L, formed by looping a piece of strap iron centrally for a short distance, and then diverging the free ends thereof. The forward end of frame L has the upward slope M on its lower end, adapting the frame L to rest down upon the shank F sufficiently to permit the insertion of the transverse bolt N through frame L and shank F.

The seed cup K is constructed of two parts, each of which has a circular flange O, extending inwardly parallel with the axis of the cup and a radial flange P at the outer edge of the flange O, and has also closed ends R. The flanges O are of such dimensions as that one of them can be passed within the other after the seed is placed within them, forming the cup K. Upon one of the flanges P is radially seated an annular series of spokes S, adapted to successively engage the earth in the onward movement of the cultivator, and thus rotate the seed cup K.

In each of the flanges O are formed oblong seed exits T, adapted to register more or less with each other, and thereby permit the passage of the seed by its own gravity, and by the force of being thrown over by the rotation of the cup K. In the other flange O is formed a series of transverse openings V, and a transverse pin W is attached to the flange O, having the pin W projected into any one of the openings V on the opposite flange, and by that means the respective slots T can be held at any relative position, so as to make the seed exits of such size as may be desired.

My machine can be made of sufficient size, if desired, to be drawn by a horse.

What I claim as my invention, and desire to secure by Letters Patent of the United States, is—

1. In a hand cultivator, the combination of the handle B, curved divergent shanks D provided, respectively, with cutting blades C—C, and suitably attached at their forward ends to said handle; and the intermediate blade E provided with shank F, pivotally seated at its upper end between the shanks D—D; in a vertical plane, and thereby adapted to be optionally turned up out of engagement with the earth, and means for locking said central blade down in working position, substantially as shown, and for the purpose described.

2. In combination with the handle B, the upwardly curved and divergent shanks D—D, provided with shovels C—C formed integral therewith, and one of said shanks provided with the lateral recess J, and the intermediate blade E provided with a shank F, pivotally seated between the shanks D—D and provided with a boss H, adapted to optionally engage said recess J; substantially as shown, and for the purpose described.

3. In a hand cultivator, a combination of two upwardly bowed and divergent shanks D—D, provided respectively with cutting blades C—C integral therewith, and intermediate blade E provided with shank F pivotally seated between the shanks D—D, and circular seed cup K provided with radial earth engaging spokes S, and adjustable seed openings T, and the frame L removably connected at its front end to the shank F, and at its rear end to the axis of the seed cup K; substantially as shown, and for the purpose described.

In testimony whereof I affix my signature in presence of two witnesses.

GEORGE ADAIR.

Witnesses:
JOHN G. MANAHAN,
MARTHA W. BARRETT.